(12) United States Patent
Song

(10) Patent No.: US 11,835,782 B2
(45) Date of Patent: *Dec. 5, 2023

(54) OPTICAL FIBER CABLE MANUFACTURING EQUIPMENT AND TRACEABLE OPTICAL FIBER CABLE MANUFACTURED THEREBY

(71) Applicant: HYESUNG Cable & Communication INC., Iksan-si (KR)

(72) Inventor: Young Bin Song, Seoul (KR)

(73) Assignee: HYESUNG CABLE & COMMUNICATION INC., Iksan-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/846,570

(22) Filed: Jun. 22, 2022

(65) Prior Publication Data

US 2023/0350149 A1  Nov. 2, 2023

(30) Foreign Application Priority Data

Apr. 27, 2022  (KR) .......................... 10-2022-0052206

(51) Int. Cl.
*G02B 6/44* (2006.01)
*G02B 6/46* (2006.01)

(52) U.S. Cl.
CPC ........... *G02B 6/4482* (2013.01); *G02B 6/562* (2023.05)

(58) Field of Classification Search
CPC ...... G02B 6/4488; G02B 6/441; G02B 6/443; G02B 6/4436
USPC .................................................. 385/128, 100
See application file for complete search history.

(56) References Cited

U.S. PATENT DOCUMENTS 5,778,652 A * 7/1998 Kunze .................. G02B 6/443
57/235

FOREIGN PATENT DOCUMENTS

KR  20110012705 A  2/2011

* cited by examiner

*Primary Examiner* — Jerry M Blevins
(74) *Attorney, Agent, or Firm* — STIP Law Group, LLC

(57) ABSTRACT

The disclosure relates to optical fiber cable manufacturing equipment and a traceable optical fiber cable manufactured thereby, and more particularly, to optical fiber cable manufacturing equipment which facilitates a sheath stripping operation for an intermediate branch or end connecting operation in the field, and also, makes it easy to trace a burying position, and a traceable optical fiber cable manufactured thereby.

5 Claims, 7 Drawing Sheets

(a)

(b)

OPTICAL FIBER CABLE MANUFACTURING EQUIPMENT AND TRACEABLE OPTICAL FIBER CABLE MANUFACTURED THEREBY

CROSS-REFERENCE TO RELATED APPLICATIONS

This application claims the priority of the Korean Patent Applications 10-2022-0052206 filed on Apr. 27, 2022, in the Korean Intellectual Property Office, the disclosure of which is incorporated herein by reference.

TECHNICAL FIELD

The disclosure relates to optical fiber cable manufacturing equipment and a traceable optical fiber cable manufactured thereby, and more particularly, to optical fiber cable manufacturing equipment which facilitates a sheath stripping operation for an intermediate branch or end connecting operation in the field, and also, makes it easy to trace a burying position, and a traceable optical fiber cable manufactured thereby.

BACKGROUND ART

An optical fiber cable has a structure including an optical fiber bundle therein and a central strength member, and typically, refers to a cable configuring a long-distance circuit, and is developing into a form of an electrical cable established between countries or between a land and an island, or into a form capable of communicating or supplying gas or water.

When a long-distance cable is installed on the ground, a high installation cost may be required and a procedure for installing may be complicated due to a problem of negotiation with landowners or between neighboring countries. Therefore, a method of burying a cable under the ground is normally applied.

When a long-distance cable is damaged, serious inconvenience (in the case of a communication cable, a computer network may be paralyzed.) may be caused, and also, astronomical economic losses may be accompanied. There are many kinds of damage to the long-distance cable, and the most representative damage is an accident caused by breaking.

When an accident occurs by damage to a cable, it is important to find a burying position of the cable rapidly and exactly. However, there may be a problem that it is not easy to find a burying position of a long-distance cable that has been once buried.

PRIOR ART LITERATURE

Patent Literature

Korean Patent Laid-Open Publication No. 10-2011-0012705 (published on Feb. 9, 2011)

DETAILED DESCRIPTION OF THE PRESENT DISCLOSURE

Technical Objects

The disclosure has been developed to solve the above-described problems of the related-art technology, and aims at providing optical fiber cable manufacturing equipment which facilitates a sheath stripping operation for an intermediate branch or end connecting operation in the field, and also, makes it easy to trace a burying position, and a traceable optical fiber cable manufactured thereby.

Technical Solving Means

To achieve the above-described object, the disclosure provides optical fiber cable manufacturing equipment including a collective core portion including a plurality of optical fibers, a metal tape disposed outside the collective core portion, and a sheath portion disposed outside the metal tape, the optical fiber cable manufacturing equipment including: a pre-bonding portion configured to pre-bond the metal tape to the outside of the collective core portion; a first coating portion disposed behind the pre-bonding portion to coat a first adhesive over at least part of both ends of the metal tape; a bonding portion disposed behind the pre-bonding portion to bond the metal tape to the outside of the collective core portion with the both ends of the metal tape overlapping each other; a second coating portion disposed behind the bonding portion to coat a second adhesive over the outside of the metal tape; a sheath fabrication portion disposed behind the second coating portion to cover the collective core portion to which the metal tape is bonded, with a sheath; and a cooling portion installed behind the sheath fabrication portion to cool the sheath portion, wherein an upper portion of the collective core portion to which the metal tape is bonded is heated before the collective core portion to which the metal tape is bonded enters the second coating portion, wherein the second adhesive is coated only over a lower portion of the collected core portion to which the metal tape is bonded in the second coating portion, wherein a melting point of the first adhesive is higher than a melting point of the second adhesive, wherein the first, second adhesives are hot melt adhesives.

In addition, the optical fiber cable manufacturing equipment may further include a wire guide portion installed between the bonding portion and the second coating portion to guide a tracing wire to a periphery of the collective core portion to which the metal tape is bonded in parallel with the collective core portion.

In addition, the wire guide portion may include: a main body which has a core passing hole penetrating through a center thereof to allow the collective core portion to pass therethrough, and a wire passing hole penetrating through an upper portion of the core passing hole to allow the tracing wire to pass therethrough; and a third coating portion coupled to the main body to supply a third adhesive to the wire passing hole and to coat the third adhesive over the tracing wire.

In addition, the second coating portion may include an adhesive supply portion configured to supply the second adhesive, a frame, and a roller portion rotatably disposed on the frame to come into contact with the collective core portion to which the metal tape is bonded. The roller portion may include a recess which is in contact with the collective core portion to which the metal tape is bonded. Only a lower portion of the collective core portion to which the metal tape is bonded may be received in the recess. The adhesive supply portion may supply the second adhesive to the recess. The optical fiber cable manufacturing equipment may further include: a first heating portion configured to melt the first adhesive supplied from the first coating portion; a second heating portion configured to heat the roller portion of the second coating portion to melt the second adhesive; a third heating portion disposed on the bonding portion to heat the collective core portion to which the metal tape is bonded;

and a fourth heating portion disposed behind the bonding portion to heat an upper side of the collective core portion to which the metal tape is bonded. The bonding portion may include a first bonding portion and a second bonding portion which is disposed behind the first bonding portion and spaced apart therefrom. The fourth heating portion may heat the collective core portion to which the metal tape is bonded, escaping from the first bonding portion. The optical fiber cable manufacturing equipment may further include a heat loss prevention cover disposed across the first bonding portion and the second bonding portion, and disposed above the collective core portion to which the metal tape is bonded. The roller portion may include a hub including a plurality of arms to be rotatably coupled to the frame, and rollers rotatably coupled to the plurality of arms, respectively, In addition, there is provided an optical fiber cable manufactured by the optical fiber cable manufacturing equipment, the optical fiber cable including: a collective core portion; a metal tape bonded to an outside of the collective core portion; a tracing wire disposed on an outside of the collective core portion to which the metal tape is bonded; and a sheath portion covering the tracing wire and the metal tape, simultaneously.

Advantageous Effects

The disclosure provides effects that a sheath stripping operation for an intermediate branch or end connecting operation is easily performed in the field, and a burying position of an optical fiber cable is easily traced.

BEST MODE FOR EMBODYING THE INVENTION

Objects, specific advantages, and new features of the disclosure will be more apparent from detailed descriptions associated with the accompanying drawings and preferred embodiments. In addition, the terms or words used in the specification and the claims should not be interpreted as being limited to ordinary or lexical meanings, and should be interpreted as having meanings and concepts conforming to the technical concept of the disclosure, based on the principle that an inventor can appropriately define a concept of a term in order to explain his/her invention in the best way. In the description of the disclosure, detailed explanations of well-known technology of related art are omitted when it is deemed that they may unnecessarily obscure the essence of the disclosure.

In explaining optical fiber cable manufacturing equipment according to an embodiment, when an element is referred to as being formed or disposed "on," "over," or "above" or "under" or "below" another element, the two elements may be disposed in contact with each other or there may be one or more other intervening elements formed or disposed between the two elements. The expressions "on," "over," or "above" or "under" or "below" may refer to an upward direction or a downward direction with reference to one element.

In addition, such terms as first, second may be used to simply distinguish a corresponding element from another, and do not limit the elements in other aspects such as importance or order.

Figure 1:
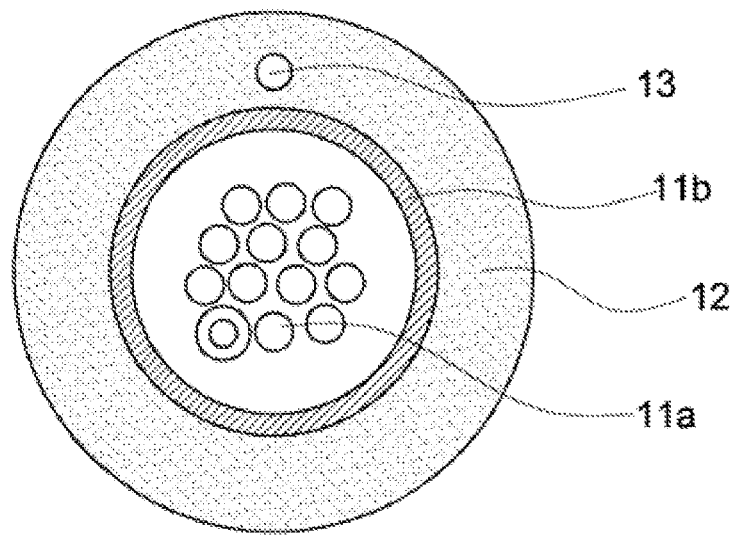
FIG. 1(*a*) and FIG. 1(*b*) are a view conceptually illustrating a cross-sectional configuration of a traceable optical fiber cable according to the disclosure.
Figure 1B:
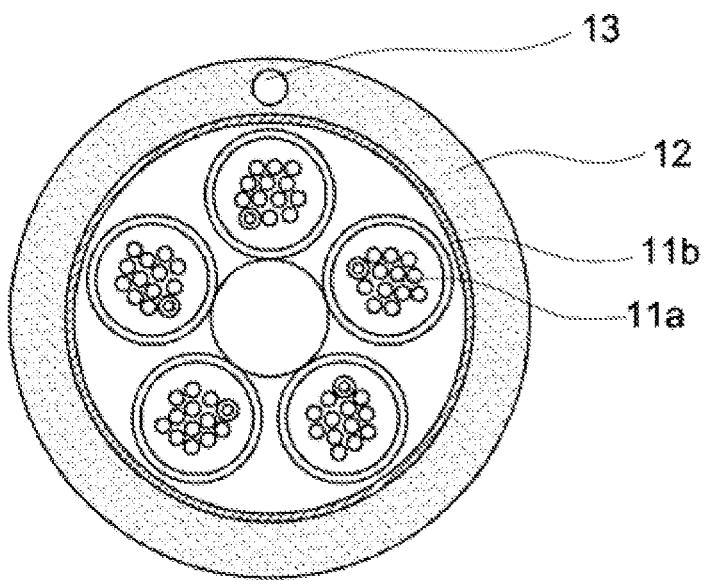

FIG. 1 is a view illustrating optical fiber cable manufacturing equipment according to an embodiment. In FIG. 1, a direction from the left to the right on the drawing is an advancing direction of a manufacturing process of an optical fiber cable. Hereinafter, "in front of," "behind" are defined with reference to the advancing direction of the manufacturing process of the optical fiber cable.

Figure 2:
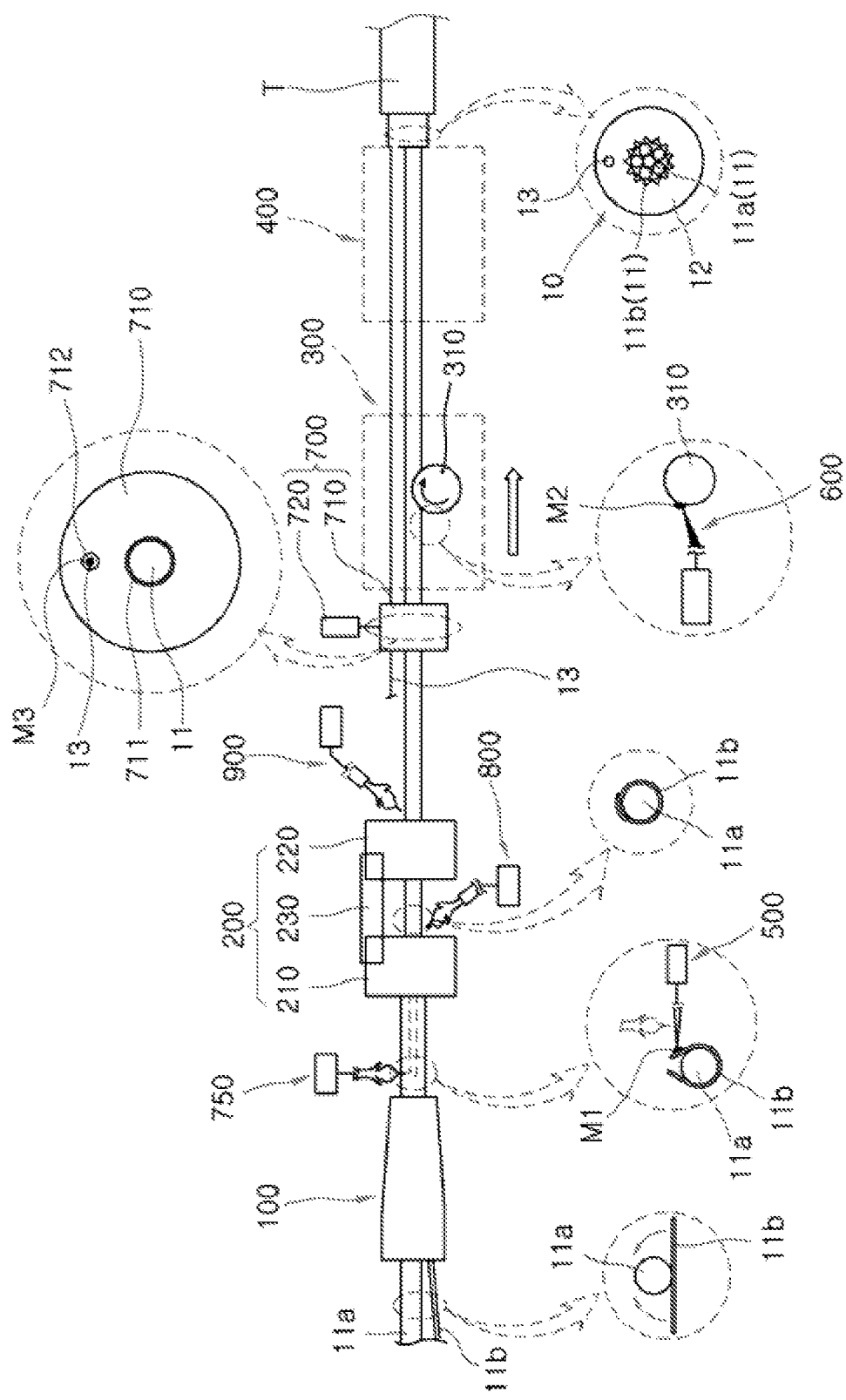
FIG. 2 is a view illustrating optical fiber cable manufacturing equipment according to an embodiment.

Referring to FIG. 2, the optical fiber cable manufacturing equipment according to an embodiment may include a pre-bonding portion 100, a bonding portion 200, a first coating portion 500, a second coating portion 300, a sheath fabrication portion 400, a cooling portion T, and a wire guide portion 700.

With reference to the advancing direction of the manufacturing process of the optical fiber cable, the pre-bonding portion 100, the first coating portion 500, the bonding portion 200, the wire guide portion 700, the second coating portion 300, the sheath fabrication portion 400, and the cooling portion T may be disposed in sequence.

A collective core portion 11*a* and a metal tape 11*b* may be supplied to the pre-bonding portion 100 all together. The collective core portion 11*a* may include a loose tube including an optical fiber therein, and a central strength member. The metal tape 11*b* is a member that encloses the collective core portion 11*a*, and prevents foreign substances from entering the inside of the collective core portion 11*a* and prevents deformation of the optical fiber cable.

The metal tape 11*b* is supplied to the pre-bonding portion 100 in a flat state. The pre-bonding portion 100 rolls the metal tape 11*b* and pre-bonds the metal tape 11*b* to the collective core portion 11*a* to let the metal tape 11*b* enclose the collective core portion 11*a*. The collective core portion 11*a* passing through the pre-bonding portion 100 is enclosed by the metal tape 11*b*, and both ends of the metal tape 11*b* are left in an open state.

The first coating portion 500 is disposed behind the pre-bonding portion 100. The first coating portion 500 coats the metal tape 11*b* pre-bonded to the collective core portion 11*a* with a first adhesive M1 (for example, any one of hot melt adhesives (polyamide, polyester, polyurethane, ethylene vinyl acetate (EVA) adhesives, or the like)). The first coating portion 500 may coat the first adhesive M1 over at least one of the both ends of the metal tape 11*b* that are in the open state. A nozzle of the first coating portion 500 is disposed adjacent to the end of the metal tape 11*b*. When the collective core portion 11*a* including the metal tape 11*b* pre-bonded thereto moves backward, a coating area of the first adhesive M1 is continuously formed from the end of the metal tape 11*b* along a transfer direction.

In order to melt the first adhesive M1, a first heating portion 750 may be provided. The first heating portion 750 may melt the first adhesive M1 by directly heating the nozzle of the first coating portion 500. A melting point of the first adhesive M1 may be within a range from 150° to 180°, for example, and may be higher than a melting point of a second adhesive M2 (for example, within a range from 130° to 170°) coated by the second coating portion 300, so that the first adhesive M1 bonds the metal tape 11*b* to the collective core portion 11*a* more strongly than a sheath portion 12.

The collective core portion 11*a* enters the bonding portion 200 with the both ends of the metal tape 11*b* being in the open state and the first adhesive M1 being coated over the both ends.

The bonding portion 200 is disposed behind the first coating portion 500 to bond the metal tape 11*b* to an outside of the collective core portion 11*a* with the both ends of the metal tape 11*b* overlapping each other.

The bonding portion 200 may include a first bonding portion 210 and a second bonding portion 220. The second bonding portion 220 is disposed behind the first bonding portion 210 and spaced apart therefrom. The metal tape 11*b* is primarily bonded to the collective core portion 11*a* in the first bonding portion 210. The collective core portion 11*a* to which the metal tape 11*b* is bonded through the first bonding portion 210 may be directly heated through a third heating portion 800.

The third heating portion 800 may serve to completely melt the first adhesive M1 which goes through the first bonding portion 210 but is not still melted, by heating the collective core potion 11 to which the metal tape is bonded.

The collective core portion 11 to which the metal tape 11*b* is bonded, heated by the third heating portion 800, enters the second bonding portion 220. In the second bonding portion 220, the metal tape 11*b* is bonded to the collective core portion 11*a* again.

The collective core portion 11 to which the metal tape 11*b* is bonded, passing through the second bonding portion 220, is heated through a fourth heating portion 900. The fourth heating portion 900 may be disposed behind the second bonding portion 220 to heat an upper side of the collective core portion 11 to which the metal tape 11*b* is bonded. This is to prevent the second adhesive M2 to be coated in the second coating portion 300 from being coated over the upper side of the collective core portion 11 to which the metal tape 11*b* is bonded. When the upper side of the collective core portion 11 to which the metal tape 11*b* is bonded is heated and its temperature increases, the second adhesive M2 may flow down without adhering. Therefore, the second adhesive M2 is prevented from excessively sticking to the upper side of the collective core portion 11 to which the metal tape 11*b* is bonded.

The bonding portion 200 may include a heat loss prevention cover 230. The heat loss prevention cover 230 may be disposed across the first bonding portion 210 and the second bonding portion 220, and may be disposed above the collective core portion 11 to which the metal tape 11*b* is bonded to prevent heat of the first heating portion 750 from being lost to the outside.

The wire guide portion 700 is installed between the bonding portion 200 and the second coating portion 300, and serves to guide supply of a tracing wire 13 to a periphery of the collective core portion 11 to which the metal tape 11*b* is bonded in parallel with the collective core portion 11.

In this case, the tracing wire 13 may use a copper wire that is easy to detect by a metal detector, and may be continuously supplied to the wire guide portion 700 through a separate wire supply unit (not shown).

The tracing wire 13 moves above the collective core portion 11 in parallel with the collective core portion 11, and may be integrally covered with the collective core portion 11*b* by the sheath portion 12 in the sheath fabrication portion 400, which will be described below.

The wire guide portion 700 may include, for example, a main body 710 which has a core passing hole 711 penetrating through a center thereof to allow the collective core portion 11 to pass therethrough, and a wire passing hole 712 formed on an upper portion of the core passing hole 711 to allow the tracing wire 13 to pass therethrough, and a third coating portion 720 which is coupled to the main body 710 to supply a third adhesive M3 to the wire passing hole 712 and to coat the third adhesive M3 over the tracing wire 13.

The collective core portion 11 to which the metal tape 11*b* is bonded in the bonding portion 200 passes through the core passing hole 711 of the main body 710 forward and backward without resistance, whereas the tracing wire 13 supplied by the wire supply unit passes through the wire passing hole 712, and moves with the third adhesive M3 being coated over a surface thereof.

The third coating portion 720 is configured to coat the third adhesive M3 over the surface of the tracing wire 13, and the third adhesive M3 serves to bond the tracing wire 13 and the sheath portion 12.

The third coating portion 720 is provided in the form of a nozzle connected to the main body 710 and facing the wire passing hole 712, and accordingly, when the tracing wire 13 passes through the wire passing hole 712 filled with the third adhesive M3, the third adhesive M3 is naturally coated over the surface of the tracing wire 13.

The third coating portion 720 may be provided to continuously supply a hot melt adhesive to the wire passing hole 712, and a detailed description thereof is omitted.

The collective core portion 11 and the tracing wire 13 passing through the core passing hole 711 and the wire passing hole 712 of the main body 710, respectively, move toward the second coating portion 300 in parallel with each other, and a separate adhesive is not coated over an outer surface of the metal tape 11*b* of the collective core portion 11 before the collective core portion 11 and the tracing wire 13 pass through the second coating portion 300, and the third adhesive M3 is only coated over the tracing wire 13.

The second coating portion 300 may be disposed behind the wire guide portion 700 to coat the second adhesive M2 (for example, hotmelt) over the metal tape 11*b* of the collective core portion 11 passing through the wire guide portion 700.

Figure 3:
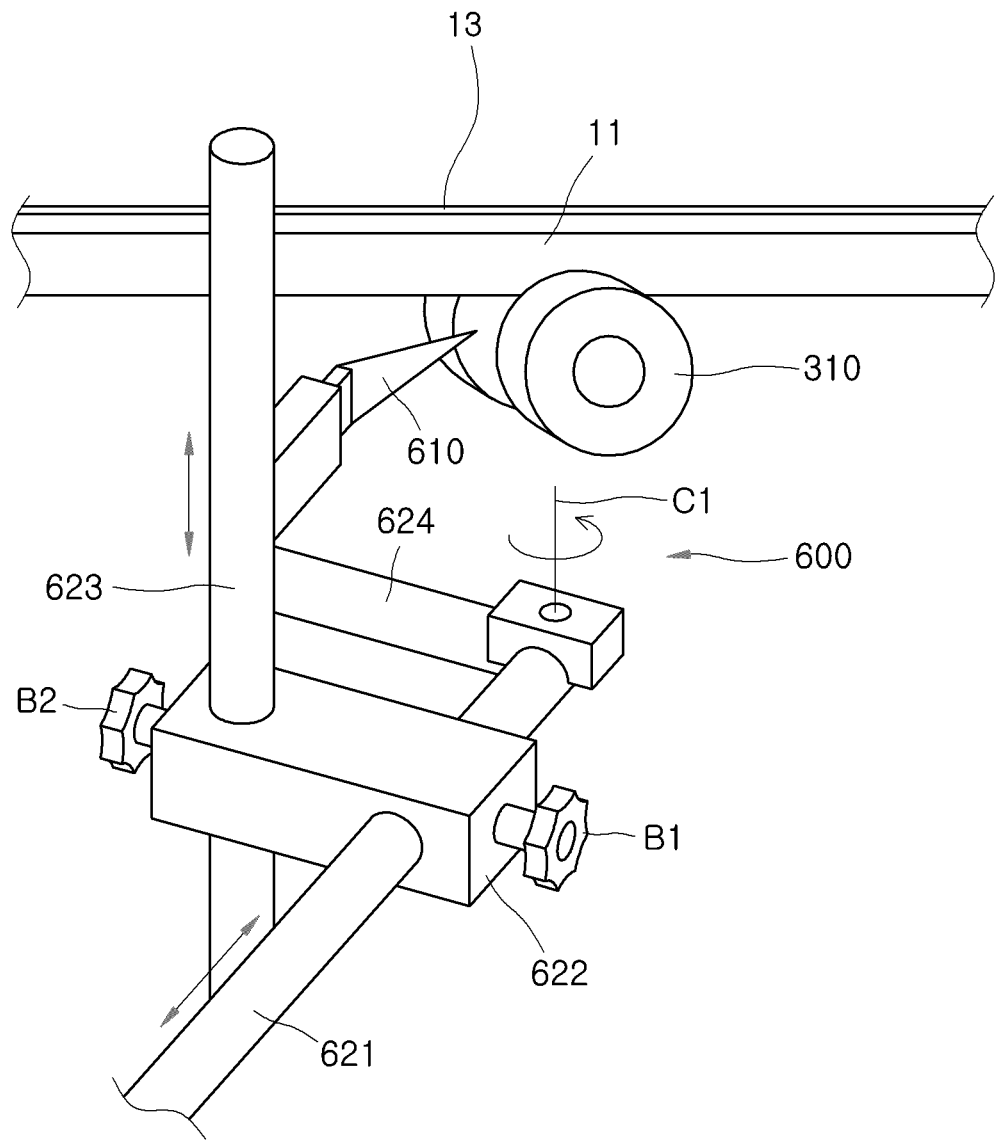
FIG. 3 is a perspective view illustrating a second coating portion.
Figure 4:
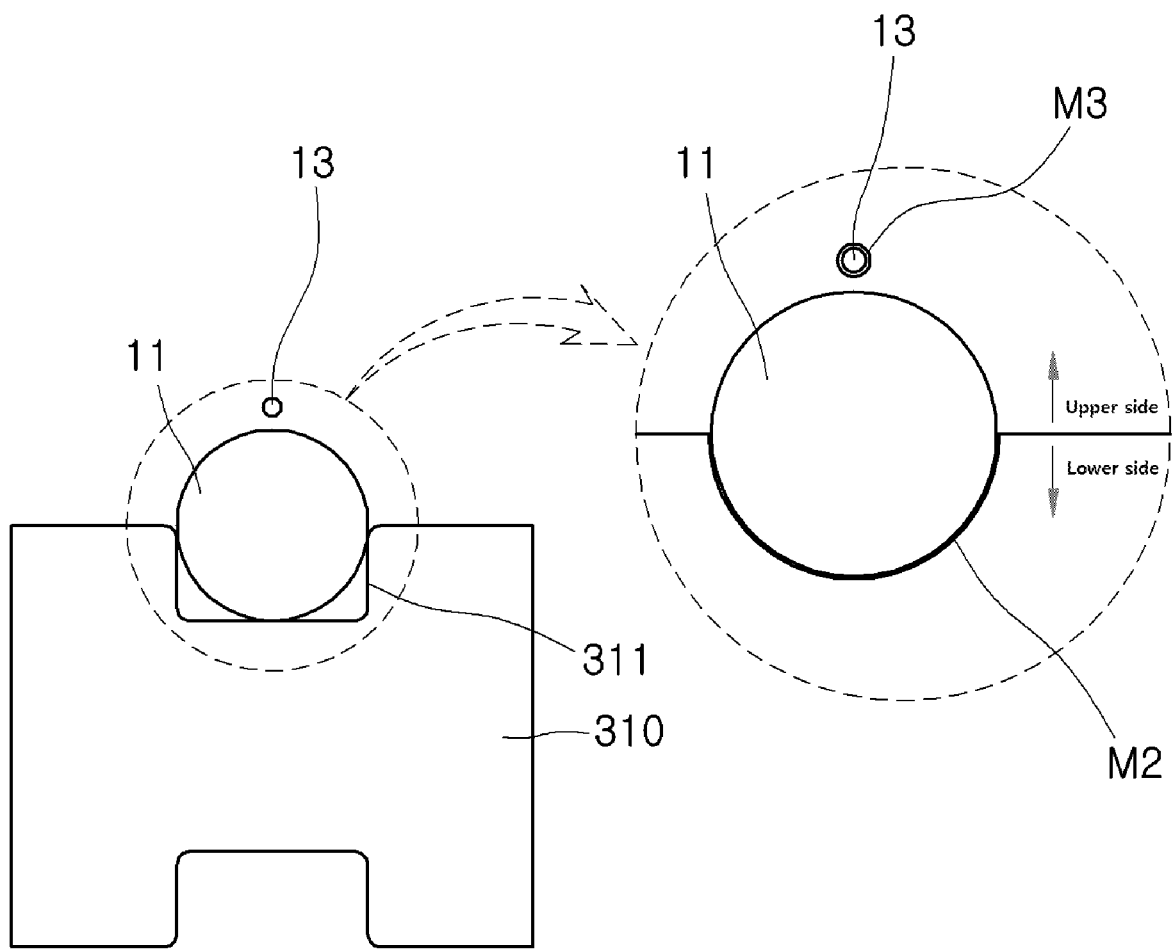
FIG. 4 is a view schematically illustrating a front surface of a roller portion shown in FIG. 3.

As shown in FIG. 3, the second coating portion 300 is to coat the second adhesive M2 over the collective core portion 11 to which the metal tape 11*b* is bonded. The second adhesive M2 bonds the collective core portion 11 to which the metal tape 11*b* is bonded and the sheath portion 12.

That is, when the collective core portion 11 and the tracing wire 13 pass through the second coating portion 300, the second adhesive M2 is coated over the collective core portion 11 with the third adhesive M3 being coated over the tracing wire 13.

In this case, the second coating portion 300 may coat the second adhesive M2 only over a lower side of the collective core portion 11 to which the metal tape 11*b* is bonded. That is, by coating the second adhesive M2 only over a half area of the collective core portion 11 to which the metal tape 11*b* is bonded, adhesion between the collective core portion 11 to which the metal tape 11*b* is bonded and the sheath portion 12 is guaranteed, and also, the sheath portion 12 is induced to be easily stripped from the collective core portion 11 to which the metal tape 11*b* is bonded.

The second coating portion 300 may include an adhesive supply portion 600 and a roller portion 310. The adhesive supply portion 600 may include a nozzle 610 to discharge the second adhesive M2 and a position adjustment portion to adjust a position of the nozzle 610. The nozzle 610 may be disposed adjacent to the roller portion 310.

The first, second, third adhesives described above may use a hot melt (thermoplastic) adhesive although there is a difference in melting points.

The position adjustment portion may include a horizontal shaft 621, a vertical shaft 623, and a body 622. The body 622 may be coupled to the horizontal shaft 621 to be movable along the horizontal shaft 621. In addition, the body 622 may be coupled to the vertical shaft 623 to be movable along the vertical shaft 623. When the body 622 moves, any one of the horizontal shaft 621 and the vertical shaft 623 moves along with the body 622.

A first bolt B1 may be disposed on one side of the body 622. The first bolt B1 may be screwed into the body 622 to fix the body 622 to the horizontal shaft 621. A second bolt B2 may be disposed on the other side of the body 622. The second bolt B2 may be screwed into the body 622 to fix the body 622 to the vertical shaft 623.

In addition, the position adjustment portion may further include an arm portion 624 coupled to the horizontal shaft 621. The arm portion 624 connects the nozzle 610 and the horizontal shaft 621. The arm portion 624 may be coupled to the horizontal shaft 621 to be rotatable about a first axis C1. The arm portion 624 may have a curved shape.

The position adjustment portion described above may adjust the position of the nozzle 610 in three-axis directions so as to align an end of the nozzle 610 with the roller portion 310.

The roller portion 310 may be rotatably coupled to a frame of the second coating portion 300. The roller portion 310 rotates due to a friction between the roller portion 310 and the collective core portion 11 to which the metal tape 11*b* is bonded.

The roller portion 310 includes a recess 311. The lower side of the collective core portion 11 to which the metal tape 11*b* is bonded is received in the recess 311. A cross-sectional shape of the recess 311 is a "⊏"-like shape to form a space to receive the lower side of the collective core portion 11 to which the metal tape 11*b* is bonded.

The second coating portion 300 supplies the second adhesive M2 to the recess 311. When the roller portion 310 is rotated with the second adhesive M2 being received in the recess 311, the second adhesive M2 is continuously coated over the lower side of the collective core portion 11 to which the metal tape is bonded.

Through the roller portion 310, the second adhesive M2 is coated only over the lower side of the collective core portion 11 to which the metal tape 11*b* is bonded, and the second adhesive M2 is not coated over the upper side of the collective core portion 11 to which the metal tape 11*b* is bonded. Accordingly, a structure that makes it easy to strip the sheath portion 12 is provided. In particular, since the upper side of the collective core portion 11 to which the metal tape 11*b* is bonded is heated before entering the second coating portion 300 and its temperature increases, the second adhesive M2 does not stick to the upper side of the collective core portion 11 to which the metal tape 11*b* is bonded, so that the sheath portion 12 may be easily stripped.

Since the lower side of the collective core portion 11 to which the metal tape 11*b* is bonded is bonded to the sheath portion 12 through the second adhesive M2, sufficient adhesion between the collective core portion 11 to which the metal tape 11*b* is bonded and the sheath portion 12 may be guaranteed.

A second heating portion 700 for heating the roller portion 310 may be included. The second heating portion 700 may heat the roller portion 310 to melt the second adhesive M2 received in the recess 311. In this case, the melting point of the second adhesive M2 is lower than the melting point of the first adhesive M1. This is to reduce adhesion between the sheath portion 12 and the collective core portion 11 to which the metal tape 11*b* is bonded lower than adhesion between the metal tape 11*b* and the collective core portion 11*a*, and to make the sheath portion 12 be easily stripped.

Figure 5:
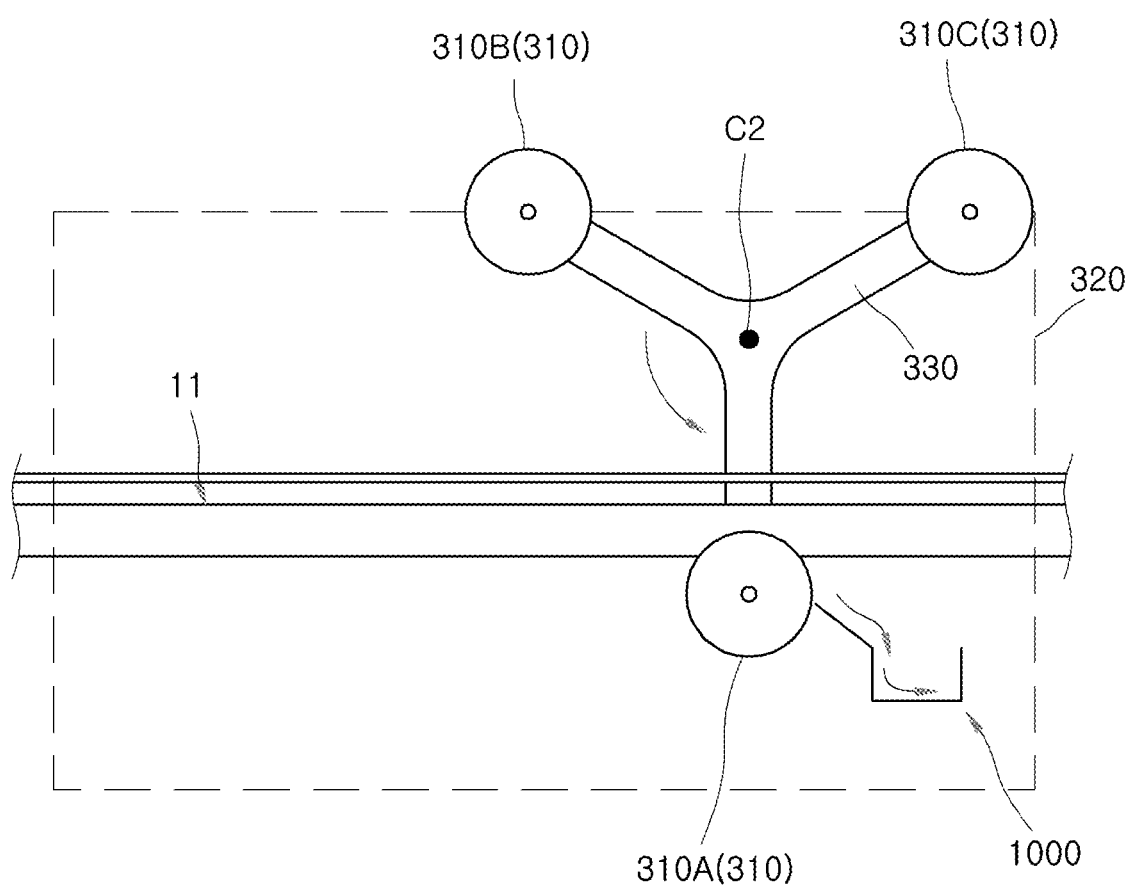
FIG. 5 is a view provided to explain a variation of the roller portion, and illustrating one side surface of the roller portion.
Figure 6:
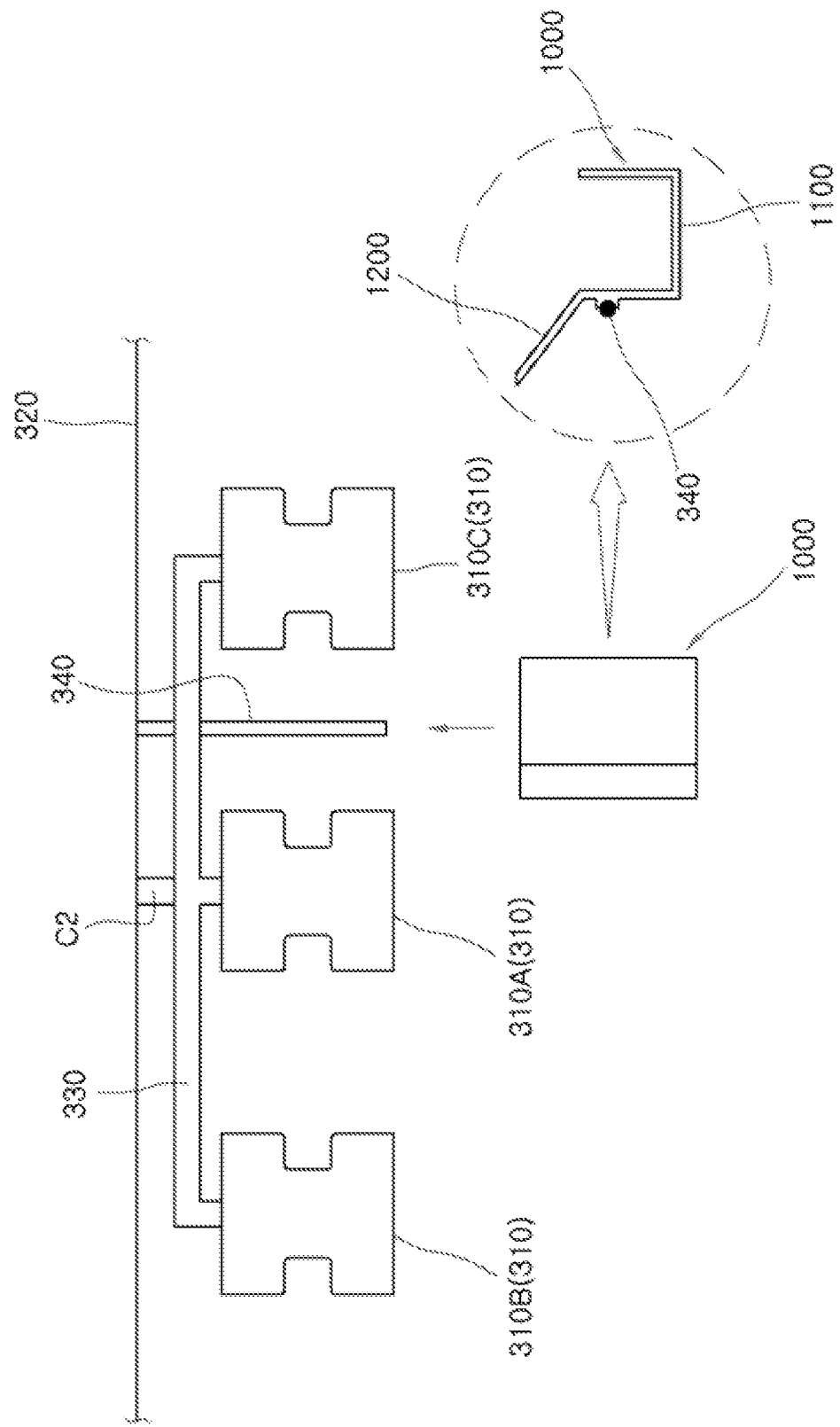
FIG. 6 is a view schematically illustrating a plane of the roller portion shown in FIG. 5.
Figure 7:
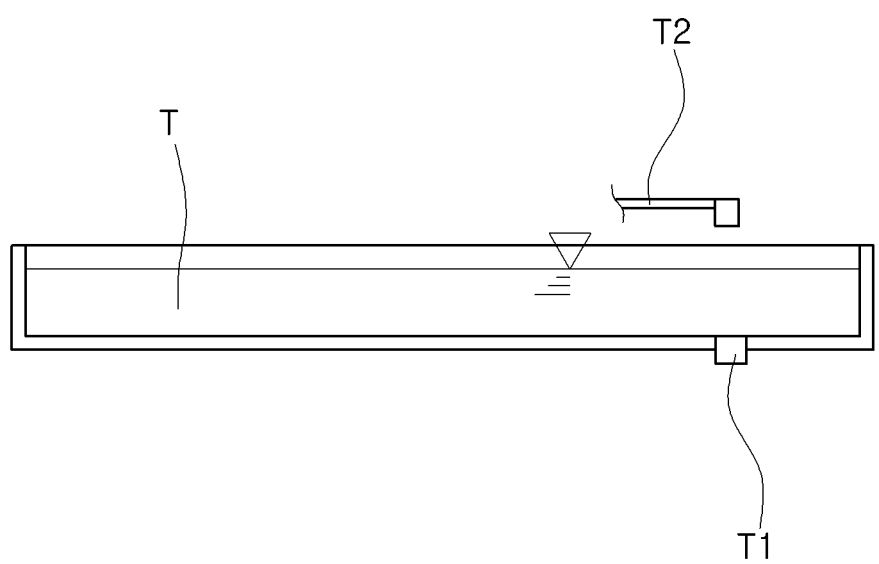
FIG. 7 is a view illustrating a cooling portion.

FIGS. 5 and 6 are views illustrating another embodiment of the roller portion 310, and referring to these drawings, the roller portion 310 may include a hub 330 including a plurality of arms rotatably coupled to the frame 320, and rollers 310A, 310B, 310C rotatably coupled to the hub 330.

When the hub 330 rotates, any one of the plurality of rollers 310A, 310B, 310C selectively comes into contact with the collective core portion 11 to which the metal tape 11*b* is bonded. A user may check a state of the roller 310A, 310B, 310C and rotate the hub 330 to bring a new roller 310A, 310B, 310C into contact with the collective core portion 11 to which the metal tape 11*b* is bonded. Since a contaminated roller may be directly replaced, a bonding portion between the collective core portion 11 to which the metal tape 11*b* is bonded and the sheath portion 12 may be prevented from being contaminated.

In addition, the second coating portion 300 may include a support portion 340 fixed to the frame 320, and a collection container 1000 removably coupled to the support portion 340.

The collection container 1000 may include a body 1100 and a scraper 1200 extended from the body 1100.

The body 1100 has a receiving space formed therein. In addition, the body 110 may include a structure such as a recess, a hole, or a slot to be coupled with the support portion 340. The scraper 1200 comes into contact with any one of the plurality of rollers 310A, 310B, 310C that is in contact with the collective core portion 11 to which the metal tape 11*b* is bonded, and scrapes the second adhesive M2 remaining on the roller 310A or foreign substances and guides the scraped substances to the collection container 1000. The second adhesive M2 or foreign substances remaining on the roller 310A are removed through the collection container 1000, so that a bonding portion between the collective core portion 11 to which the metal tape 11B is bonded and the sheath portion 12 is prevented from being contaminated.

When the collective core portion 11 and the tracing wire 13 coated with the second adhesive M2 and the third adhesive M3, respectively, enter the sheath fabrication portion 400, a predetermined sheath material melted in the sheath fabrication portion 400 covers the metal tape 11*b* of the collective core portion 11 and the tracing wire 13 which are moving in parallel with each other, simultaneously, such that an integrated optical fiber cable may be injected while being drawn.

After the optical fiber cable is injected while being drawn, the optical fiber cable enters the cooling portion T installed behind the sheath fabrication portion 400 and the sheath portion 12 is cooled.

The cooling portion T is formed in the shape of a water tank to cool the sheath portion 12 in a water cooling method, and contains a coolant therein, and may include a drain valve T1 to discharge the coolant which undergoes heat exchange by temperature of the sheath portion 12, and a coolant supply pipe T2 to continuously supply the coolant.

As shown in FIG. 1, a traceable optical fiber cable manufactured as described above is formed in a structure, including the collective core portion 11a forming the inside of the optical fiber cable, the metal tape 11b bonded to the outside of the collective core portion 11a to protect the collective core portion 11a primarily, the tracing wire 13 disposed an outside of the collective core portion 11 to which the metal tape 11b is bonded, and the sheath portion 12 covering the tracing wire 13 and the metal tape 11b simultaneously. Even when the optical fiber cable is buried deeply, a burying position may be easily traced through the tracing wire 13.

Up to now, one preferred embodiment of the disclosure has been described in detail with reference to the accompanying drawings.

One embodiment of the disclosure described above should be understood as being merely an example in all aspects and not being limited, and the scope of the disclosure is defined not by the detailed descriptions explained above, but by the appended claims described below. In addition, it should be understood that not only the meaning and the scope of the claims but also all changes or changeable forms derived from equivalent concepts thereto are included in the scope of the disclosure.

EXPLANATION OF SINGS

100: pre-bonding portion
200: bonding portion
210: first bonding portion
220: second bonding portion
230: heat loss prevention cover
300: second coating portion
310: roller portion
400: sheath fabrication portion
500: first coating portion
600: adhesive supply portion
700: second heating portion
750: first heating portion
800: third heating portion
900: fourth heating portion

What is claimed is:

1. Optical fiber cable manufacturing equipment comprising a collective core portion comprising a plurality of optical fibers, a metal tape disposed outside the collective core portion, and a sheath portion disposed outside the metal tape, the optical fiber cable manufacturing equipment comprising:
a pre-bonding portion configured to pre-bond the metal tape to the outside of the collective core portion;
a first coating portion disposed behind the pre-bonding portion to coat a first adhesive over at least part of both ends of the metal tape;
a bonding portion disposed behind the pre-bonding portion to bond the metal tape to the outside of the collective core portion with the both ends of the metal tape overlapping each other;
a second coating portion disposed behind the bonding portion to coat a second adhesive over the outside of the metal tape;
a sheath fabrication portion disposed behind the second coating portion to cover the collective core portion to which the metal tape is bonded, with a sheath; and
a cooling portion installed behind the sheath fabrication portion to cool the sheath portion,
wherein an upper portion of the collective core portion to which the metal tape is bonded is heated before the collective core portion to which the metal tape is bonded enters the second coating portion,
wherein the second adhesive is coated only over a lower portion of the collected core portion to which the metal tape is bonded in the second coating portion,
wherein a melting point of the first adhesive is higher than a melting point of the second adhesive,
wherein the first, second adhesives are hot melt adhesives.

2. The optical fiber cable manufacturing equipment of claim 1, further comprising a wire guide portion installed between the bonding portion and the second coating portion to guide a tracing wire to a periphery of the collective core portion to which the metal tape is bonded in parallel with the collective core portion.

3. The optical fiber cable manufacturing equipment of claim 2, wherein the wire guide portion comprises:
a main body which has a core passing hole penetrating through a center thereof to allow the collective core portion to pass therethrough, and a wire passing hole penetrating through an upper portion of the core passing hole to allow the tracing wire to pass therethrough; and
a third coating portion coupled to the main body to supply a third adhesive to the wire passing hole and to coat the third adhesive over the tracing wire.

4. The optical fiber cable manufacturing equipment of claim 3, wherein the second coating portion comprises an adhesive supply portion configured to supply the second adhesive, a frame, and a roller portion rotatably disposed on the frame to come into contact with the collective core portion to which the metal tape is bonded,
wherein the roller portion comprises a recess which is in contact with the collective core portion to which the metal tape is bonded,
wherein only a lower portion of the collective core portion to which the metal tape is bonded is received in the recess,
wherein the adhesive supply portion is configured to supply the second adhesive to the recess,
wherein the optical fiber cable manufacturing equipment further comprises:
a first heating portion configured to melt the first adhesive supplied from the first coating portion;
a second heating portion configured to heat the roller portion of the second coating portion to melt the second adhesive;
a third heating portion disposed on the bonding portion to heat the collective core portion to which the metal tape is bonded; and
a fourth heating portion disposed behind the bonding portion to heat an upper side of the collective core portion to which the metal tape is bonded,
wherein the bonding portion comprises a first bonding portion and a second bonding portion which is disposed behind the first bonding portion and spaced apart therefrom,
wherein the fourth heating portion is configured to heat the collective core portion to which the metal tape is bonded, escaping from the first bonding portion, and
wherein the optical fiber cable manufacturing equipment further comprises a heat loss prevention cover disposed across the first bonding portion and the second bonding portion, and disposed above the collective core portion to which the metal tape is bonded.

5. A traceable optical fiber cable manufactured by the optical fiber cable manufacturing equipment of claim 4, the traceable optical fiber cable comprising:
a collective core portion;

a metal tape bonded to an outside of the collective core portion;

a tracing wire disposed on an outside of the collective core portion to which the metal tape is bonded; and a sheath portion covering the tracing wire and the metal tape, simultaneously.

* * * * *